(12) United States Patent
Matsumoto et al.

(10) Patent No.: US 6,345,263 B1
(45) Date of Patent: *Feb. 5, 2002

(54) ELECTRONIC PURSE APPLICATION SYSTEM AND METHOD THEREOF

(75) Inventors: Kenji Matsumoto, Yokohama; Shigeyuki Itoh, Zushi; Yutaka Takami, Yokohama; Masayuki Inoue, Fujisawa; Iwao Aizawa, Yokohama, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,555

(22) Filed: Jun. 10, 1997

(30) Foreign Application Priority Data

Jun. 14, 1996 (JP) .............................................. 8-153673

(51) Int. Cl.[7] .............................................. G06F 17/60
(52) U.S. Cl. .............................. 705/41; 705/41; 705/42
(58) Field of Search .............................. 705/41, 42, 43, 705/17

(56) References Cited

U.S. PATENT DOCUMENTS

| | | | | |
|---|---|---|---|---|
| 4,739,510 A | * | 4/1988 | Jeffers et al. .................. | 380/15 |
| 4,930,160 A | * | 5/1990 | Vogel .......................... | 380/23 |
| 5,144,115 A | * | 9/1992 | Yoshida ....................... | 235/379 |
| 5,172,785 A | * | 12/1992 | Takahashi ..................... | 180/141 |

(List continued on next page.)

FOREIGN PATENT DOCUMENTS

| | | | |
|---|---|---|---|
| DE | 29705423 U1 | * | 7/1997 |
| EP | 0813173 A2 | * | 6/1997 |
| EP | 0858225 A1 | * | 8/1998 |
| EP | 866400 A1 | * | 9/1998 |
| EP | 0921682 A2 | * | 6/1999 |
| JP | 392966 | | 4/1991 |
| WO | WO 98/04969 | * | 2/1998 |
| WO | WO 98/04969 | * | 9/1998 |

OTHER PUBLICATIONS

Stephan Seidman, "TVs to Toll Booths: Smart Card Capabilities", Security Management, v38, n4, pp. 47–52, Apr. 1994.*

Faulkner & Gray, Inc., "Hardware News—The Market Values ValuCards, But So Far It's Strictly Niches", POS News, Jun. 1, 1993.*

"Automatic Video Rental Kiosks for UK", Screen Digest, Jun. 1, 1996.*

Messmer, Ellen, "Credit Card Firms Plan 'Digital Money' Future", Network World, vol.12, No. 17, pp. 47, 103, Apr. 24, 1995.*

Mitchell, Alan and Stuart Littlewood, "Marketing's Smart Transformation", Marketing, pp. 16–18, May 21, 1992.*

Peyret, Patrice, Gilles Lisimaque, & T.Y. Chua, "Smart Cards Provide Very High Security and Flexibility in Subscribers Management, " IEEE Transactions on Consumer Electronics, vol. 36, No. 3, Aug. 1990.*

*Primary Examiner*—Tariq R. Hafiz
*Assistant Examiner*—Susanna Meinecke-Diaz
(74) *Attorney, Agent, or Firm*—Antonelli, Terry, Stout & Kraus, LLP

(57) ABSTRACT

An IC card arrangement wherein information which is the standard for transaction conditions such as amount information in an IC card is registered within the IC card, and further included is additional conditional information such as age, sex, etc. information for an owner of the card, or a predetermined contract destination. When a transaction is attempted using the IC card, restrictions and conditions for the owner, etc., are automatically set using the additional conditional information within the IC card.

8 Claims, 9 Drawing Sheets

U.S. PATENT DOCUMENTS

| | | | |
|---|---|---|---|
| 5,339,239 A | * 8/1994 | Manabe et al. | 364/401 |
| 5,364,270 A | * 11/1994 | Aoyama et al. | 434/55 |
| 5,434,678 A | * 7/1995 | Abecassis | 358/342 |
| 5,543,925 A | * 8/1996 | Timmermans | 358/310 |
| 5,546,471 A | * 8/1996 | Merjanian | 382/124 |
| 5,603,078 A | * 2/1997 | Henderson et al. | 455/5.1 |
| 5,666,412 A | * 9/1997 | Handelman et al. | 380/4 |
| 5,722,526 A | * 3/1998 | Sharrard | 194/346 |
| 5,744,787 A | * 4/1998 | Teicher | 235/380 |
| 5,748,737 A | * 5/1998 | Daggar | 380/24 |
| 5,754,258 A | * 5/1998 | Hanaya et al. | 348/734 |
| 5,754,654 A | * 5/1998 | Hiroya et al. | 380/24 |
| 5,839,119 A | * 11/1998 | Krsul et al. | 705/39 |
| 5,857,149 A | * 1/1999 | Suzuki | 455/186.1 |
| 5,870,155 A | * 2/1999 | Erlin | 348/734 |
| 5,880,769 A | * 3/1999 | Nemirofsky et al. | 348/12 |
| 5,907,831 A | * 5/1999 | Lotvin et al. | 705/14 |
| 5,953,485 A | * 9/1999 | Abecassis | 386/68 |
| 5,973,756 A | * 10/1999 | Erlin | 348/734 |
| 5,979,757 A | * 11/1999 | Tracy et al. | 235/383 |

\* cited by examiner

ELECTRONIC PURSE APPLICATION SYSTEM AND METHOD THEREOF

BACKGROUND OF THE INVENTION

1. Field of the Invention

The present invention relates to a system and method thereof using the standard information for judging approval or disapproval and conditions of transaction when carrying out transactions using an electronic purse system and more particularly to an electronic purse application system and method thereof having electronic money information as well as age information of an owner in an IC card.

2. Description of the Prior Art

At present, an alcoholic drink or cigarette vending machine uses cash for clearing. However, when a minor attempts to buy alcoholic drinks or cigarettes, the selling cannot be stopped; therefore countermeasures such as preventing of selling at night are taken. In a pay TV broadcast such as CS broadcast or CATV, the charge for a program selected by a TV viewer is withdrawn from a bank using a credit card. Also in this case, countermeasures such as inputting of a code number are taken so as to prevent a child from watching an adult program. However, in either case mentioned above, selling to a minor cannot be prevented perfectly.

On the other hand, as described in Japanese Laid-Open Patent Application 3-92966, a perfect cashless transaction by an electronic purse system using an IC card has been examined. This is a system that if amount information which is optionally designated is written into a memory in an IC card and necessary amount information is sent from the IC card for clearing, the transaction can be completed without using cash.

As digital broadcasting and Internet advance these days, program limiting to minors is an important problem. Also with respect to selling of alcoholic drinks and cigarettes, selling by vending machines at night is stopped at present. However, there is a problem imposed that selling to minors cannot be prevented perfectly. Furthermore, it also raises a problem for an automatic payment, n such a case as the amount of charge is different between an adult and a child such as a railroad or bus fare, or a theather entrance fee.

SUMMARY OF THE INVENTION

An object of the present invention is to eliminate the difficulties of the prior arts mentioned above and to provide an electronic purse application system and method thereof for allowing appropriate use of electronic money automatically taking care of restrictions and conditions due to a standard information such as age, distinction of sex, etc., of a user and guarantee and discrimination of his status when electronic money is to be used.

By doing this, it is attempted to automatically prevent selling to a minor and a disqualified transaction by discriminating the age information and others at the time of clearing by electronic money.

To accomplish the above object, the present invention is an electronic purse system and a method thereof having an IC card for storing electronic money information and information for giving transaction conditions using electronic money, wherein the information for giving transaction conditions is read from the IC card by an IC card read/write means, and the approval or disapproval of transaction inputted by an input means for inputting transaction information using electronic money is decided on the basis of the aforementioned read information for giving transaction conditions and the prestored standard information. When the decision is approval, the electronic money information in the IC card is updated by the charge for the transaction on the basis of the information for giving transaction information.

More concretely, the present invention comprises an automatic transaction terminal having an IC card for storing electronic money information, age information such as owner's age or date of birth, and others, an IC card read/write means for reading and writing information of the IC card, an IC card control means for controlling mounting and ejection of the IC card, an input means for selecting a good, a sales amount information storage means for storing electronic money information equivalent to the amount of the good, a good pick up control means for controlling picking-up of the good, and a processing means for judging approval or disapproval of selling of the good.

Only when the age information of the owner of the IC card is equivalent to the age for which the desired good can be sold as a result of judgment by the processing means, the electronic money equivalent to the amount of the good is subtracted from the IC card and stored in the sales amount information storage means and the good is picked up from the automatic transaction terminal by the good pick up control means.

As mentioned above, according to the present invention, by storing electronic money information as well as age information of the owner of an IC card and others in the IC card, it is possible to discriminate this age information at the time of transaction and clear the charge. Therefore, selling of alcoholic drinks or cigarettes to a minor can be prevented. In a pay TV broadcast, when the balance of an IC card of a viewer is shorted or the age of an owner of an IC card is under age limit of a program, the release of scrambling can be stopped automatically. Furthermore, this can be applied also to clearing when the amount of charge is different between an adult and a child such as a railroad or bus fare or a theater entrance fee.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

The embodiments of the present invention will be explained by referring to FIGS. 1 to 9.

Figure 1:
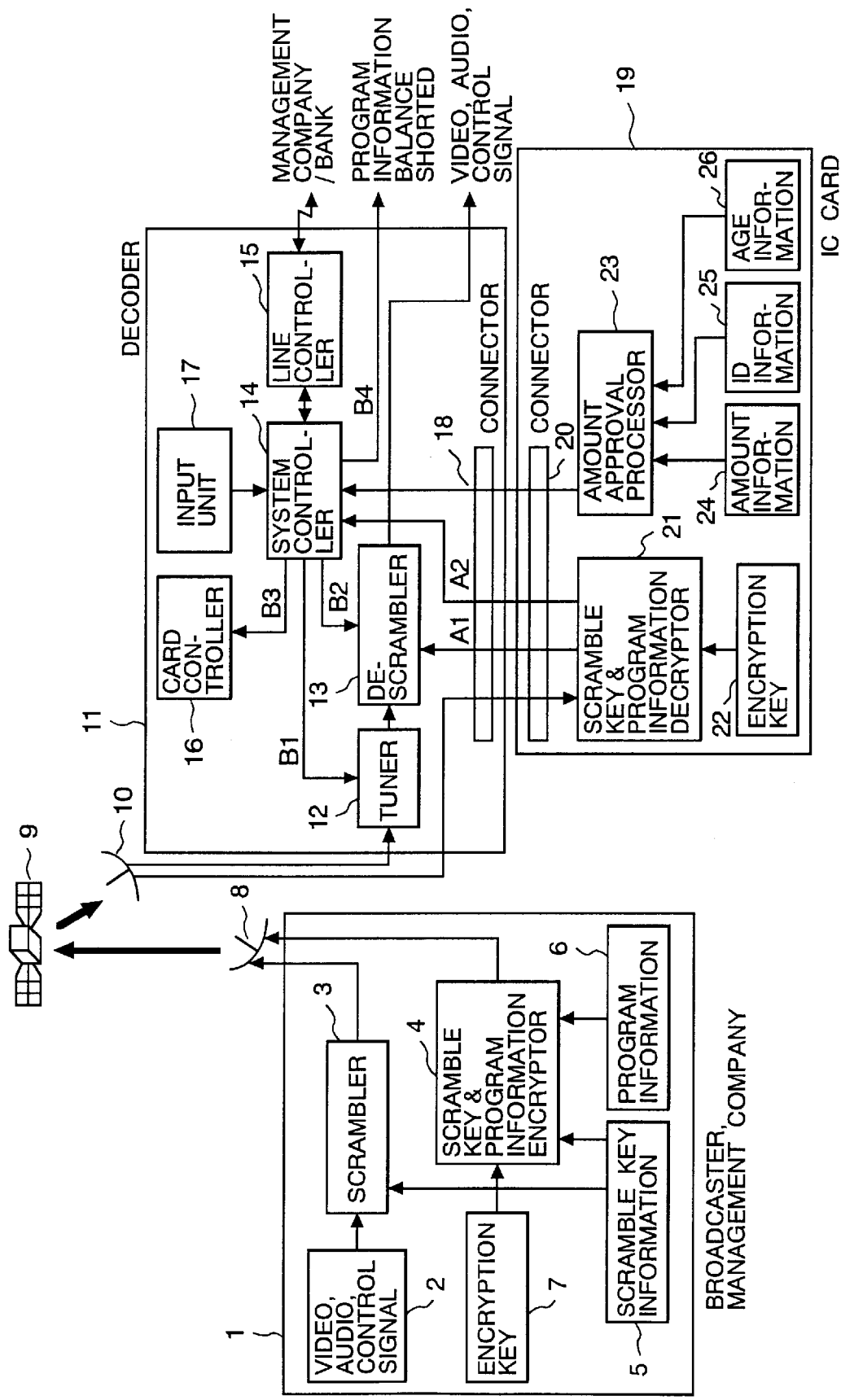
FIG. 1 shows an embodiment when the present invention is applied to clearing in a pay TV broadcast.

FIG. 1 shows an embodiment of a pay TV broadcasting system using the present invention, which is a system storing encryption key information for releasing scrambling of video, audio, and control signal and amount information for amount approval in an IC card. By storing age information such as the age or date of birth of an owner and others in the IC card and using age limit information which is sent in a pay TV broadcast at the same time, the system can make the encryption key unusable automatically when the balance is shorted or a child attempts to watch an adult program. As a result, the scrambling is not released and a viewer cannot watch the program.

Numeral 1 indicates a broadcaster and management company, 2 video, audio, and control signal, 3 a scrambler, 4 a scramble key & program information encryptor, 5 a scramble key information storage, 6 a program information storage, 7 an encryption key storage, 8 a transmitting antenna, 9 a communication satellite, 10 a receiving antenna, 11 a decoder, 12 a tuner, 13 a descrambler, 14 a system controller, 15 a line controller, 16 an IC card controller, 17 an input unit, 18 a connector, 19 an IC card, 20 a connector, 21 a scramble key & program information decryptor, 22 an encryption key storage, 23 an amount approval processor, 24 an amount information storage, 25 an ID information storage, and 26 an age information storage.

In this embodiment, information is transferred to a viewer from a broadcaster using a communication satellite. However, broadcasting by ground waves such as VHF and UHF or broadcasting using cables such as CATV may be used.

Firstly, a broadcaster and management company will be explained in detail. Video, audio, and control signal to be transferred to a viewer are outputted from a data bank 2 and encrypted by the scrambler 3. In this case, each signal is encrypted by the scramble key stored in the scramble key information storage 5 according to a predetermined rule.

Together with this scramble key, program information such as a program guide and contract information stored in the program information storage 6 is encrypted by the scramble key & program information encryptor 4. Also in this case, program information is encrypted by the encryption key stored in the encryption key storage 7 according to a predetermined rule in the case of encryption. When an age limit is included in a program to be sent, the information on age limit is encrypted as the aforementioned program information.

These encrypted data are sent to the communication satellite 9 by the transmitting antenna 8 and resent to a viewer from the communication satellite thereafter.

Next, the viewer side will be explained in detail. When a viewer inserts the IC card 19 into the decoder 11, he can receive services. Firstly, various data sent from the communication satellite are received by the receiving antenna 10 and supplied to the decoder 11. Among them, data encrypted by the scrambler 3 is processed by the tuner 12, while data encrypted by the scramble key & program information encryptor 4 is processed by the scramble key & program information decryptor 21 in the IC card.

In the case of processing by the decryptor 21, data is decrypted by the encryption key stored in the encryption key storage 22 according to a predetermined rule. This encryption key is managed by the management company in a uniform manner, so that a viewer who is not under contract with the management company cannot decrypt data by the decryptor 21.

Among data decrypted by the scramble key & program information decryptor 21, the scramble key information is supplied to the descrambler 13 (A1), while data such as a program guide and contract information is supplied to the system controller 14 (A2) and then outputted from the decoder (B4) and displayed on the TV screen. When there is age limit information in a program, this data is also supplied to the system controller 14 (A2).

When the viewer chooses a program to be watched from the program guide and selects it by the input unit 17, only the program selected by the viewer is extracted by the tuner 12 by a control signal outputted from the system controller 14 (B1) and data is supplied to the descrambler 13. This data is encrypted by the scramble key according to a fixed rule and outputted from the decoder 11, so that the viewer can take pleasure in the selected program on television.

Next, charge approval for program reception will be explained. There is the amount information storage 24 in the IC card 19 and when the viewer agrees with payment from the input unit 17 when the program is selected, the amount of charge is automatically withdrawn from the storage 24 and the electronic money information is sent to the management company and bank via the amount approval processor 23, the system controller 14, and the line controller 15.

When the balance in the IC card is shorted at the time of charge approval, a control signal is supplied to the system controller 14 from the amount approval processor 23. The data such as an age limit of the selected program is supplied to the system controller 14 from the scramble key & program information decryptor 21 (A2) and the age information of the owner of the IC card stored in the age information storage 26 is supplied to the system controller 14 from the amount approval processor 23 at the same time. Therefore, when the balance in the IC card is shorted or a program selected by a viewer is under age limit, decryption by the descrambler 13 is automatically prohibited by a control signal (B2) outputted from the system controller 14 and the viewer cannot watch the program. In this case, since the system controller 14 outputs the control signal (B3), the IC card 19 is automatically ejected by the card controller 16 and the processing ends.

Figure 2:
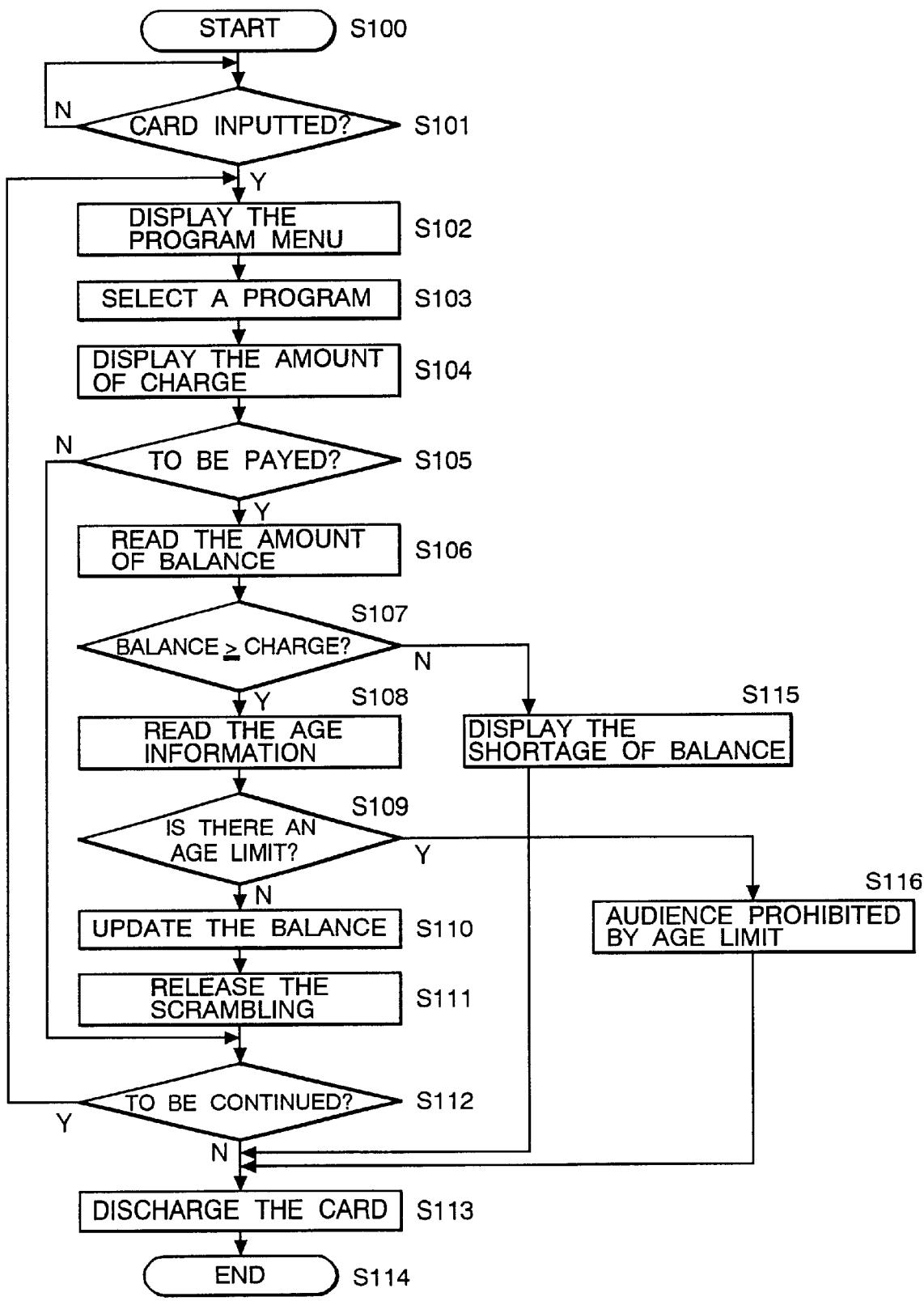
FIG. 2 shows an example of the operation flow on the viewer side when the present invention is applied to clearing in a pay TV broadcast.

FIG. 2 shows the operation flow of the viewer in the aforementioned embodiment. Discharge approval and age limit mentioned above will be explained in detail using it.

When the viewer inserts the IC card 19 into the decoder 11 (Step 101), the program menu is displayed on the TV screen (Step 102). Thereafter, when the viewer selects a program to be watched (Step 103), the amount of charge is displayed on the TV screen (Step 104). When the viewer agrees with payment of the charge (Step 105), the amount of balance in the IC card is read (Step 106). Next, whether the amount of charge can be paid from the amount of balance or not is judged by the amount approval processor 23 (Step 107). If payment is impossible, a display of shortage of balance is outputted from the system controller 14 (Step 115) and then the IC card is ejected (Step 113) and the processing ends.

On the other hand, when payment is possible, the age information in the IC card is read next (Step 108). Thereafter, whether the age of the viewer is under age limit of the selected program or not is judged by the system controller 14 (Step 109). If the age is not under age limit, the balance in the IC card is updated (Step 110) and then the data is decrypted by the descrambler 13 and the scrambling is released (Step 111). If the age is under age limit, an indication that audience is prohibited due to an age limit is displayed on the TV screen (Step 116), and then the IC card is ejected (Step 113), and the processing ends.

When the program ends, a display of whether audience is to be continued or not is outputted on the TV screen (Step 112). If audience is to be continued, the program menu is displayed again (Step 102). If audience is not to be continued, the IC card is ejected (Step 113) and the processing ends.

As mentioned above, in this embodiment, the age information of the owner of the IC card as well as the encryption key information for releasing the scrambling of video, audio, and control signal and the amount information for charge approval are stored in one IC card, so that when the balance is shorted or the age of the owner of the IC card is under age limit of the program, the release of scrambling can be stopped automatically.

In the aforementioned embodiment, the amount of charge is sent or received between the IC card of a viewer and the IC card of the management company or bank. However, it is possible to set an IC card in the decoder 11 and store sent electronic money in the decoder once. The age limit information of the selected program is sent as program information. However, it may be added to the output signal of the video, audio, and control signal bank 2. In this case, the system has a constitution that only the age limit information among the data outputted from the descrambler 13 is supplied to the system controller 14 and the other video, audio, and control signal are stored in a buffer once and then outputted from the decoder 11. Therefore, when audience is prohibited due to an age limit, by stopping the operation of the buffer by a control signal from the system controller 14, the output from the decoder 11 can be stopped.

Figure 3:
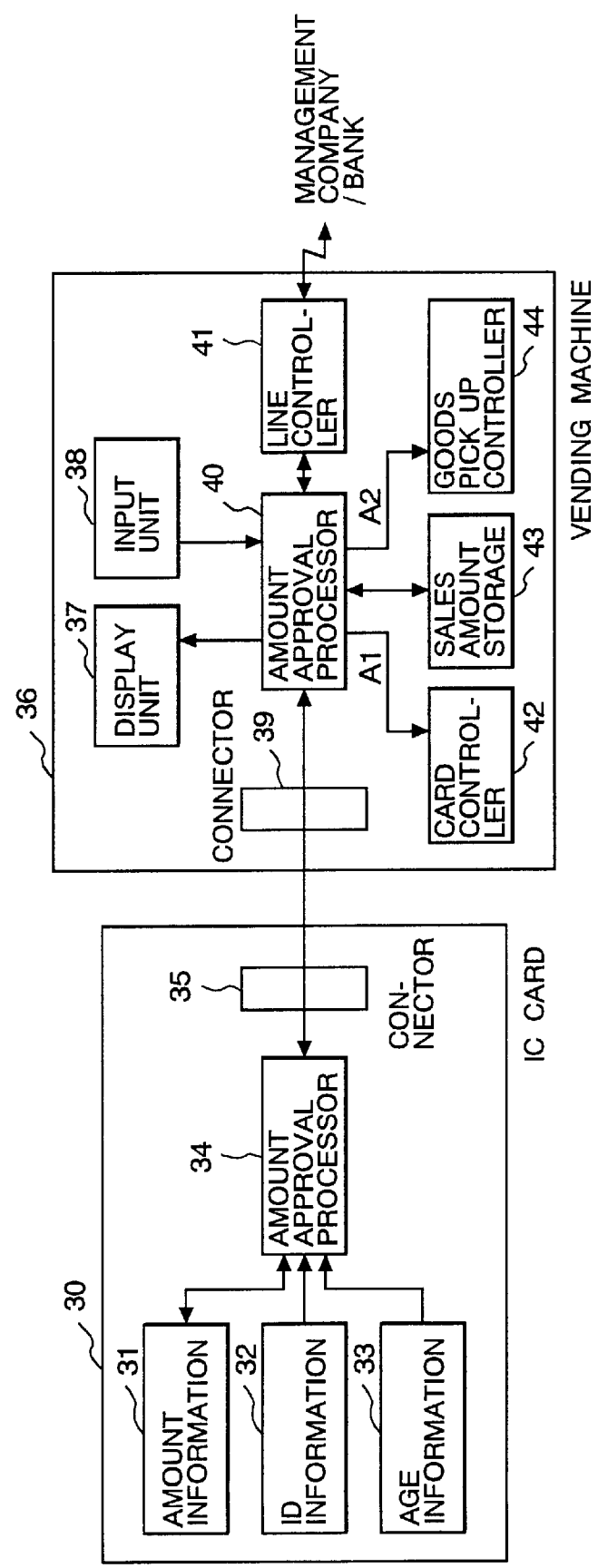
FIG. 3 shows an embodiment when the present invention is applied to an alcoholic drink or cigarette vending machine.

Next, an embodiment of a vending machine using the present invention is shown in FIG. 3. Also in this case, a charge is approved by the amount information in the IC card. In an alcoholic drink or cigarette vending machine, by using age information of a card owner stored in an IC card, selling to a minor can be stopped automatically.

Numeral 30 indicates an IC card, 31 an amount information storage, 32 an ID information storage, 33 an age information storage, 34 an amount approval processor, 35 a connector, 36 a vending machine, 37 a display unit, 38 an input unit, 39 a connector, 40 an amount approval processor, 41 a line controller, 42 a card controller, 43 a sales amount storage, and 44 a goods pick up controller.

An example of an alcoholic drinks vending machine will be explained hereunder. When a customer inserts the IC card 30 into the vending machine 36 and selects a desired good from the input unit 38, the amount of charge is withdrawn from the amount information storage 31 in the IC card and the electronic money information is stored in the sales amount storage 43 in the vending machine. Thereafter, the sales amount is sent to the management company and bank via the line controller 41.

When the balance in the IC card is shorted at the time of charge approval or the age information stored in the age information storage 33 is under age limit of a good, the control signal (A2) is supplied to the goods pick up controller 44, so that the goods pick up is automatically stopped. If this occurs, an indication of transaction stop is displayed on the display unit 37 and the control signal (A1) is also supplied to the card controller 42 at the same time, so that the IC card 30 is automatically ejected from the card controller 42 and the processing ends.

Figure 4:
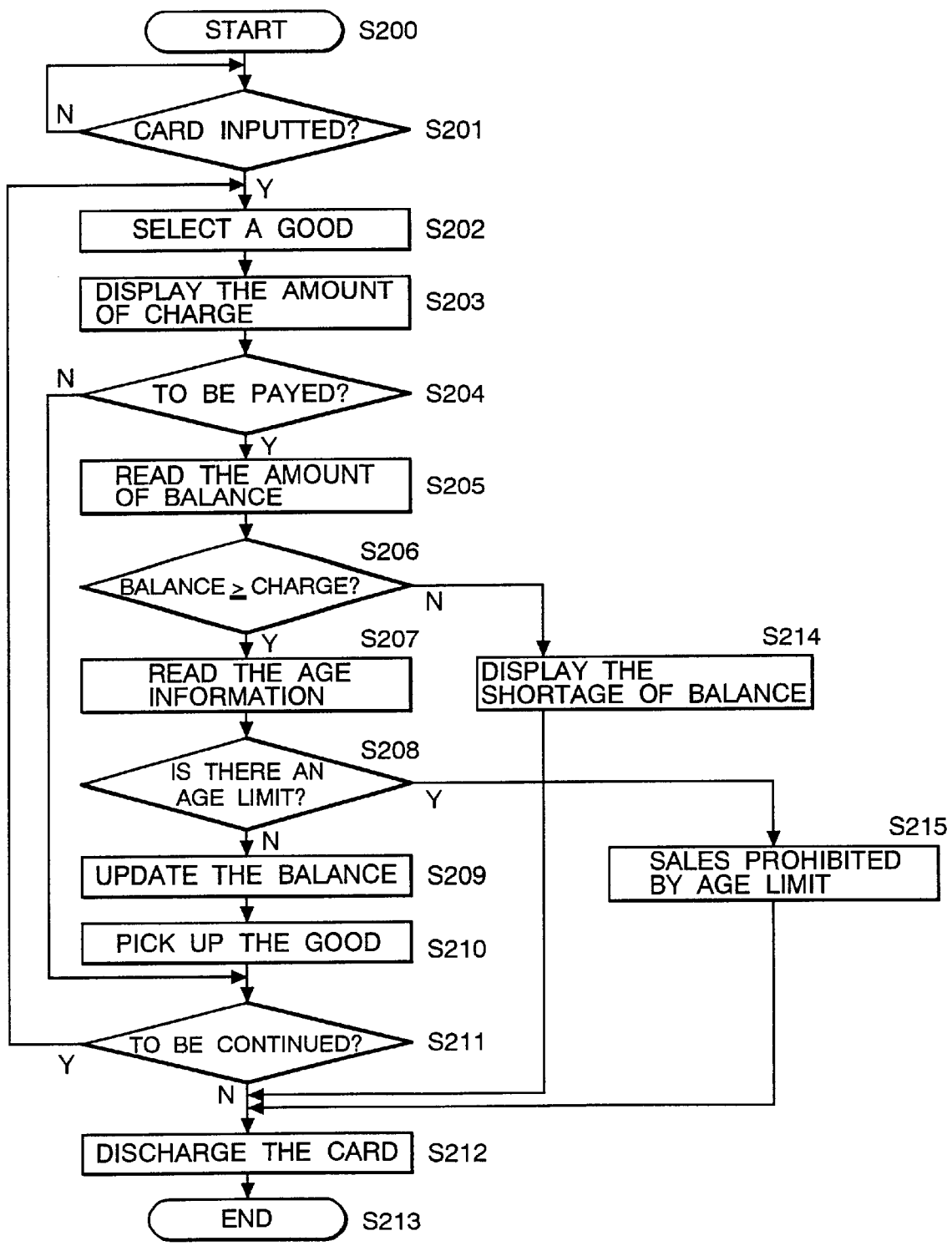
FIG. 4 shows an example of the operation flow of a customer when the present invention is applied to a alcoholic drinks or cigarette vending machine.

FIG. 4 shows the operation flow of the customer in the aforementioned embodiment. Discharge approval and age limit mentioned above will be explained in detail using it.

When the customer inserts the IC card 30 into the vending machine 36 (Step 201) and selects a good to be purchased from the input unit 38 (Step 202), the amount of charge is displayed on the display unit 37 (Step 203). When the customer agrees with payment of the charge (Step 204), the amount of balance in the IC card is read (Step 205). Thereafter, whether the amount of charge can be paid from the read amount of balance or not is judged by the amount approval processor 40 (Step 206). If payment is impossible, a display of shortage of balance is outputted (Step 214) and then the IC card is ejected (Step 212) and the processing ends.

On the other hand, when payment is possible, the age information in the IC card is read next (Step 207). Next, whether the age of the customer is under age limit of the selected good or not is judged by the amount approval processor 40 (Step 208). If the age is not under age limit, the balance in the IC card is updated (Step 209) and the purchased good is picked up (Step 210). If a good is to be purchased continuously thereafter (Step 211), the customer selects the good once again (Step 202). If no good is to be purchased, the IC card is ejected (Step 212) and the processing ends. If the age is under age limit, an indication that audience is prohibited due to an age limit is displayed (Step 215), and then the IC card is ejected (Step 212), and the processing ends.

By doing this, for example, in an alcoholic drink vending machine, when the balance is shorted or a minor attempts to buy an alcoholic drink, the selling is automatically stopped.

Figure 5:
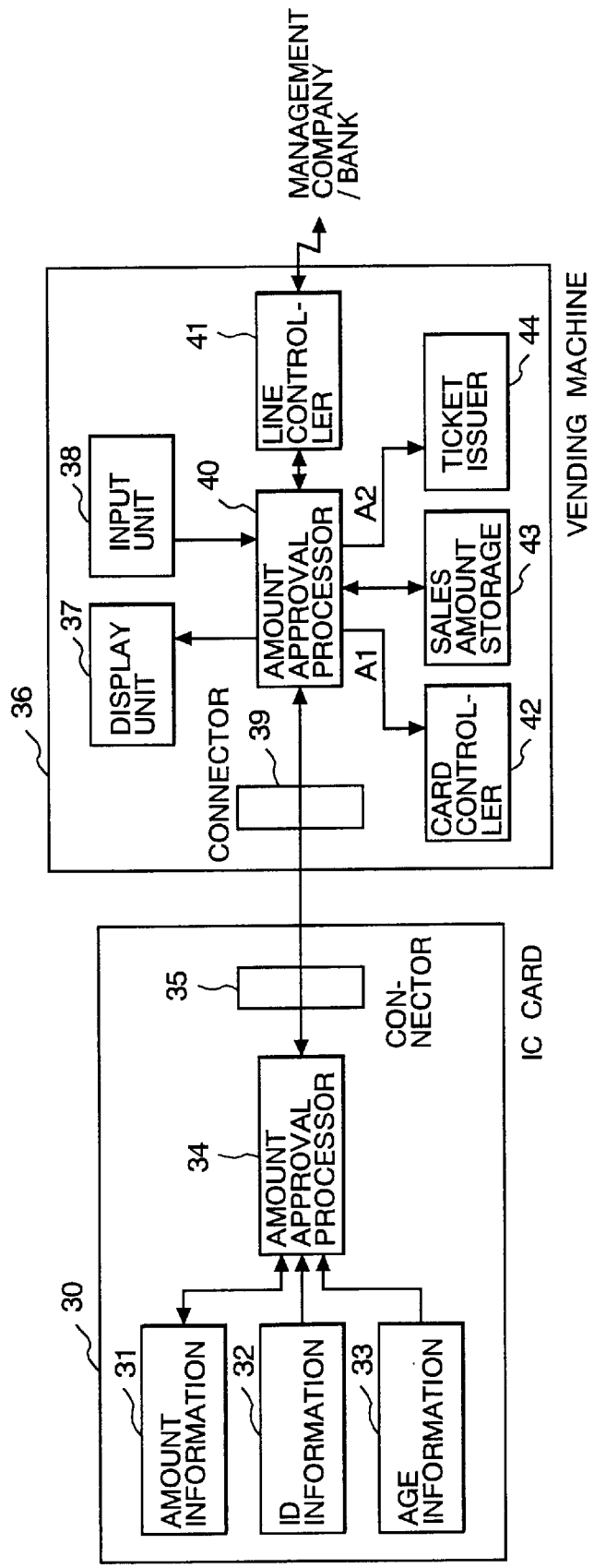
FIG. 5 shows an embodiment when the present invention is applied to a vending machine for admission tickets of a theater or others.

Another embodiment of a vending machine using the present invention is shown in FIG. 5 next. Numeral 44 indicates a ticket issuer.

An admission ticket in a theater or recreation ground is different in the amount of charge between a child and an adult. The present invention can automatically discriminate a visitor and collect the charge. In this embodiment, the IC card 30 is inserted into the vending machine 36 and the amount of charge is cleared. However, also in a system that just by using and passing a non-contact IC card through the gate, the amount of charge is cleared, the present invention can be executed.

Figure 6:
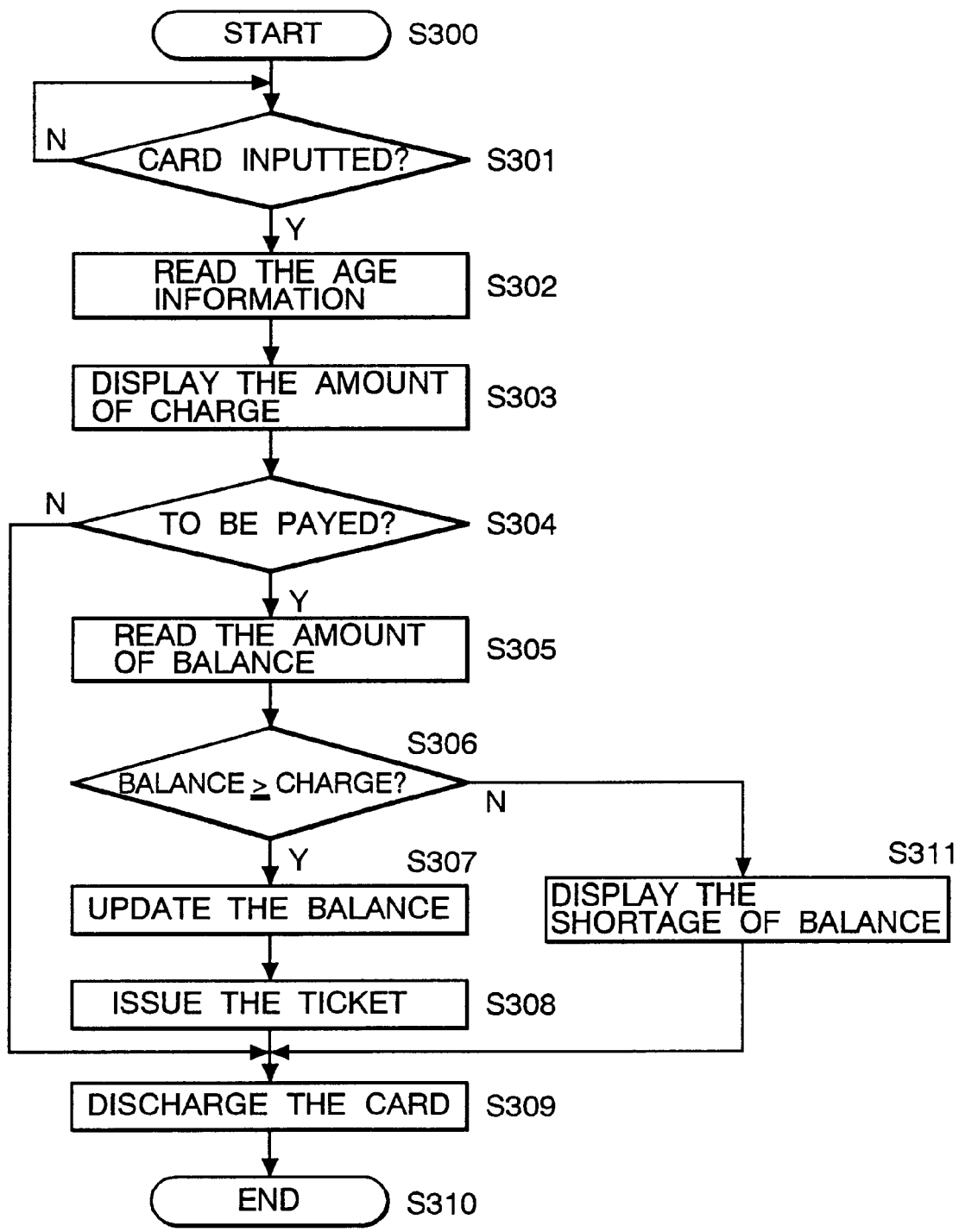
FIG. 6 shows an example of the operation flow of a customer when the present invention is applied to an admission ticket vending machine.

FIG. 6 shows the operation flow of the customer in the aforementioned embodiment. Discharge approval mentioned above will be explained in detail using it.

When the customer inserts the IC card 30 into the vending machine 36 (Step 301), the age information 33 in the IC card is read first (Step 302). The amount approval processor 40 calculates the amount of charge to be paid by the card owner from the age information and displays the amount of charge on the display unit 37 (Step 303). When the customer agrees with payment of the displayed charge (Step 304), the amount of balance in the IC card is read next (Step 305). Thereafter, whether the amount of charge can be paid from the read amount of balance or not is judged by the amount approval processor 40 (Step 306). If payment is impossible, a display of shortage of balance is outputted (Step 311) and then the IC card is ejected (Step 309) and the processing ends.

On the other hand, when payment is possible, the balance in the IC card is updated (Step 307) and an admission ticket is issued (Step 308). Thereafter, the IC card is ejected (Step 309) and the processing ends.

In the aforementioned embodiment, only one ticket of the owner of the IC card can be purchased. If a plurality of tickets are to be purchased, it is realized by designating the number of tickets from the input unit 38.

Figure 7:
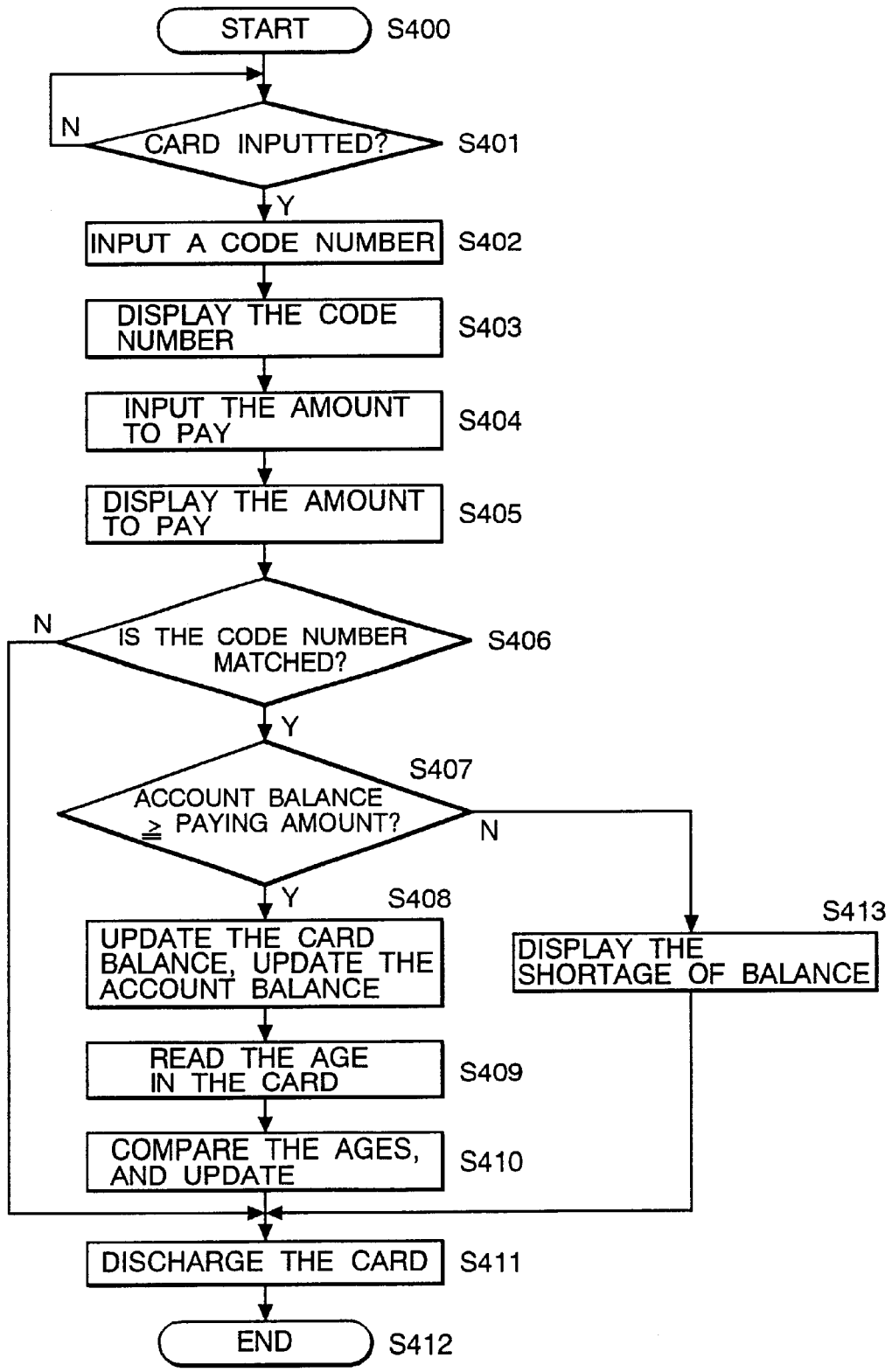
FIG. 7 shows an embodiment that age information in an IC card is updated in the present invention.

Next, an example of updating of the age information in the IC card will be explained by referring to FIG. 7. In the age information storage in the IC card, a concrete age of the owner or information such as teens or twenties is stored. However, to protect the privacy of the owner, the present invention does not store the information of date of birth. On the other hand, to open a bank account, individual information such as date of birth is registered in the bank, so that in the embodiment shown in FIG. 7, the age information in the card is compared and updated at the time of access to the bank.

An example of a case that electronic money is paid in an IC card will be explained. When a customer inserts the card into the ATM of the bank (Step 401) or accesses the bank using the telephone line, a code number is inputted first (Step 402) and the inputted code number is displayed (Step 403). When the customer inputs the amount to be withdrawn from the bank account (Step 404) next, the amount is displayed (Step 405).

Then, the aforementioned code number is compared with the code number registered in the bank (S406). When they are not matched with each other, the IC card is ejected (Step 411) and the processing ends. When they are matched with each other, whether withdrawing from the account is possible or not is judged (Step 407). When payment is possible, the balance in the IC card and the balance in the bank account are updated (Step 408) and then the age information in the IC card is read (Step 409). On the other hand, when payment is impossible, an indication that the account balance is shorted is displayed (Step 413) and then the IC card is ejected (Step 411) and the processing ends.

When the age information in the IC card is read, comparison with the information of date of birth of the owner registered in the bank starts. Only when correction is necessary, the age information in the IC card is updated (Step 410). Thereafter, the IC card is ejected (Step 411) and the processing ends.

By doing this, the age information of the owner in the IC card is corrected only when the customer accesses the bank. It is possible to store the information of date of birth in an IC card and to compare and update the age always when a customer accesses a device containing a clock such as an ATM in a bank or a POS terminal in a store.

On the other hand, when the age information in an IC card is made updatable as mentioned above, it may be considered that the IC card is falsified dishonestly. Therefore, the age information in an IC card is made unupdatable. However, it is possible to set a term to the IC card itself and update the age information of the owner at the time of updating of the card.

Figure 8:
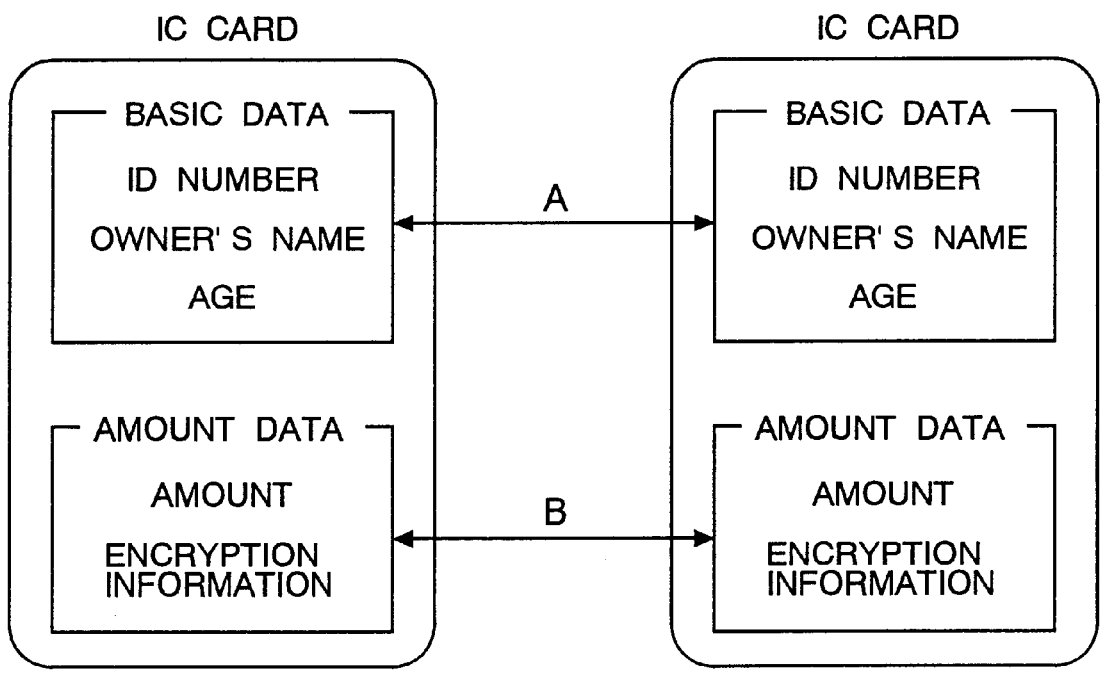
FIG. 8 shows an example that data is sent or received between IC cards in the present invention.

Next, an example of transmitting and receiving of data between IC cards will be explained by referring to FIG. 8. In this case, the basic data such as the ID No. and owner's name and age and amount data such as an amount and encryption information (encryption key) are stored in each IC card. When electronic money is sent or received between IC cards, the aforementioned basic data is exchanged between the paying side and the receiving side first and the customer is ascertained (A). Thereafter, the information such as the remittance of electronic money is encrypted using the encryption key and the encrypted data is sent and received between the paying side and the receiving side (B).

As mentioned above, when an amount is to be sent or received, the age information of an owner is also transmitted always, so that age limit and charge discrimination can be executed automatically on the basis of this age information. It is possible to add the age information to the ID number itself of the IC card without storing the ID number and age data separately as mentioned above.

Figure 9:
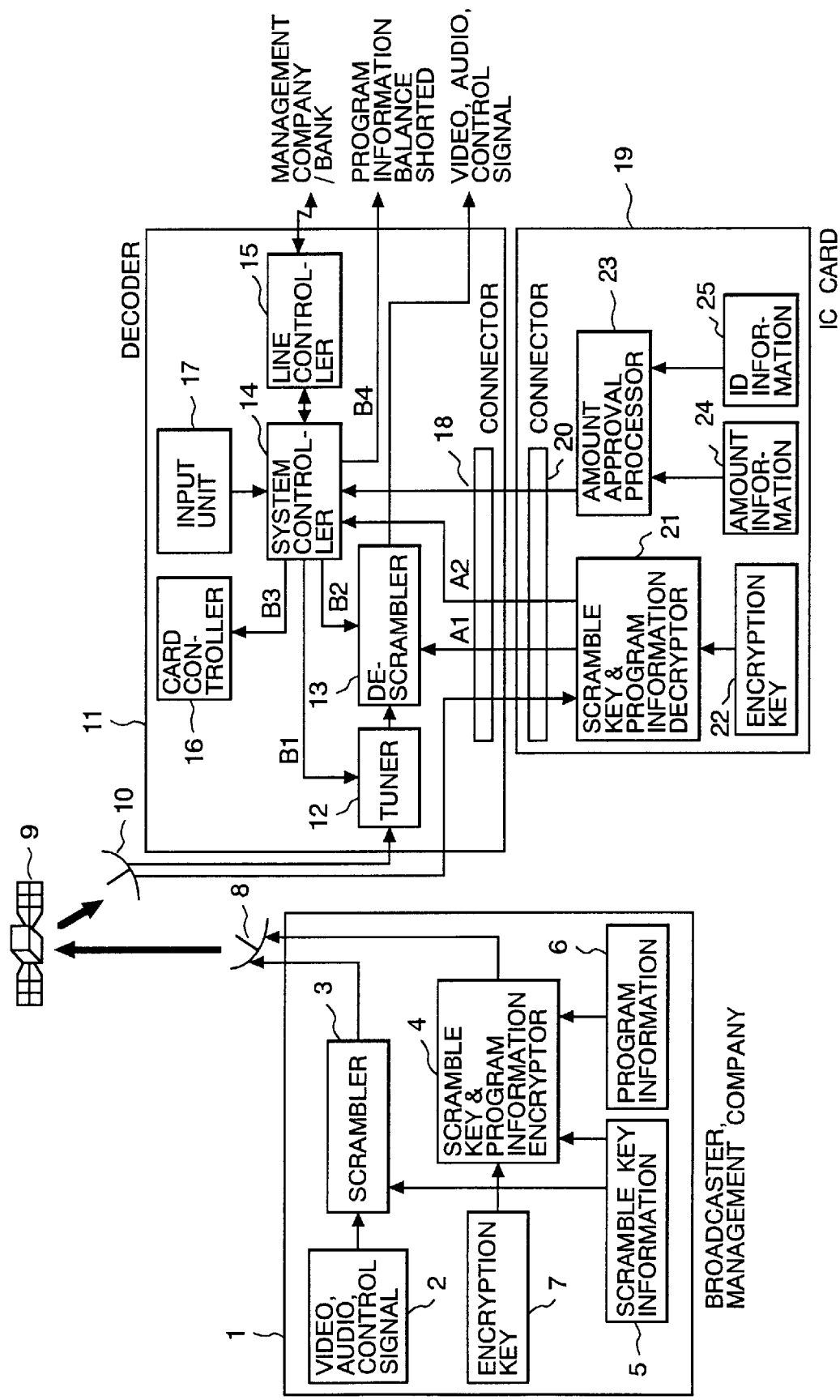
FIG. 9 shows another embodiment when the present invention is applied to clearing in a pay TV broadcast.

Finally, another storing method of age information will be explained by referring to FIG. 9. In the embodiments shown in FIGS. 1 to 8, the age information of a card owner is stored in the IC card and a customer accesses the IC card and compares the age at the time of transaction. However, it is also possible to store the age information of a card owner in the bank or management company and compare the age information by accessing the bank or management company as required at the time of transaction. In the pay TV broadcasting system shown in FIG. 9, the age information of a card owner is supplied to the line controller 15 from the bank or management company via the line. Thereafter, this age information is supplied to the system controller 14, so that the operation of the descrambler 13 can be stopped as required.

In this case, the individual information of the owner is not stored in the IC card, so that the privacy of the card owner can be protected when the IC card is lost. Furthermore, the information of the card owner can be changed any time, so that it is possible to add various data in addition to the age information of the card owner, prevent dishonest use, for example, in case of card loss, and stop the use of the card immediately when a person put on the blacklist attempts to use the card. It is also possible to store the card use status of every card owner in the bank or management company and thus give various premium services to a customer using the card frequently.

It is also possible to store the kind of license held by a user and the distinction of sex in place of the age information. By doing this, even a good requiring a specific license for purchase can be transacted by an IC card.

According to the present invention, when electronic money information as well as age information of a card owner are stored in an IC card, it is possible to discriminate this age information at the time of transaction and clear the charge. Therefore, in a pay TV broadcast, when the balance in the IC card of a viewer is shorted or the age of an owner of an IC card is under age limit of a program, the release of scrambling can be stopped automatically. Selling of alcoholic drinks or cigarettes to a minor can be also prevented. Furthermore, the present invention can be applied to clearing of a railroad or bus fare or a theater entrance fee.

Furthermore, by use of status discrimination (guarantee) information in addition to age information, prevention of dishonest use in case of card loss and new individual services by the bank and management company can be made possible.

The invention claimed is:

1. An electronic purse application system comprising:
    an IC card which stores electronic money information and non-age/non-birth-date ID data and encryption key information for decrypting encrypted data which constitute at least one of a video, audio, and data signal;
    a receiver which receives transmitted encrypted information and corresponding standard age information for judging approval or disapproval of selling encrypted digital information data;

a line controller which transmits said non-age/non-birth-date ID data stored in said IC card to a center and receives age information corresponding to transmitted said non-age/non-birth-date ID data;

a processor which judges approval or disapproval of selling of said encrypted data on a basis of said age information received by said line controller and said standard age information received by said receiver, and balance of said money information stored in said IC card and the price information of said encrypted data, and subtracts a selling price of purchased information data from said electronic money information of said IC card; and a decoder which decrypts said encrypted data using said encryption key data stored in said IC card when said processor decides approval of selling of said encrypted data.

2. An electronic purse application device using an IC card which stores electronic money information and non-age/non-birth-date ID data and encryption key information for decrypting encrypted data which constitute at least one of a video, audio, and data signal, said device comprising:

a receiver which receives transmitted encrypted information and corresponding standard age information for judging approval or disapproval of selling encrypted digital information data;

a line controller which transmits said non-age/non-birth-date ID data stored in said IC card to a center and receives age information corresponding to transmitted ID data;

a processor which judges approval or disapproval of selling of said encrypted data on a basis of said age information received by said line controller and said standard age information stored received by said receiver, and balance of said money information stored in said IC card and the price information of said encrypted data, and subtracts a selling price of purchased information data from said electronic money information of said IC card; and a decoder which decrypts said encrypted data using said encryption key data stored in said IC card when said processor decides approval of selling of said encrypted data.

3. An electronic purse application according to claim 2, wherein said standard information is age information indicating approval or disapproval of viewing of predetermined program, and when said age information received by said line controller indicates an age capable of viewing of said program, said processor substracts a price for viewing from said electronic money information of said IC card.

4. An electronic purse application device according to claim 2,
wherein said encrypted data constitute a program transmitted from a broadcasting station, and wherein said standard information data is transmitted with encrypted data from said broadcasting station.

5. An IC card system comprising:

an IC card which stores non-age/non-birth-date ID data and encryption key information for decrypting encrypted data which constitute at lest one of a video, audio, and data signal;

a receiver which receives transmitted encrypted information and corresponding standard age information for judging approval or disapproval of selling encrypted digital information data;

a line controller which transmits said non-age/non-birth-date ID data stored in said IC card to a center and receives age information corresponding to transmitted said non-age/non-birth-date ID data;

a processor which judges approval or disapproval of selling of said encrypted data on a basis of said age information received by said line controller and said standard age information received by said receiver; and a decoder which decrypts said encrypted data using said encryption key data stored in said IC card when said processor decides approval of selling of said encrypted data.

6. An IC card device using an IC card which stores non-age/non-birth-date ID data and encryption key information for decrypting encrypted data which constitute at least one of a video, audio, and data signal, said device comprising:

a receiver which receives transmitted encrypted information and corresponding standard age information for judging approval or disapproval of selling encrypted digital information data;

a line controller which transmits said non-age/non-birth-date ID data stored in said IC card to a center and receives age information corresponding to transmitted ID data;

a processor which judges approval or disapproval of selling of said encrypted data on a basis of said age information received by said line controller and said standard age information received by said receiver; and a decoder which decrypts said encrypted data using said encryption key data stored in said IC card when said processor decides approval of selling of said encrypted data.

7. An IC card application according to claim 6, wherein said standard information is age information indicating approval or disapproval of viewing of predetermined program, and when said age information received by said line controller indicates an age capable of viewing of said program.

8. An IC card application device according to claim 6, wherein said encrypted data constitute a program transmitted from a broadcasting station, and wherein said standard information data is transmitted with encrypted data from said broadcasting station.

* * * * *